United States Patent

Ponziani et al.

(10) Patent No.: US 7,481,100 B2
(45) Date of Patent: Jan. 27, 2009

(54) METHOD AND APPARATUS FOR SENSOR FAULT DETECTION AND COMPENSATION

(75) Inventors: Robert Louis Ponziani, West Chester, OH (US); Sridhar Adibhatla, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 96 days.

(21) Appl. No.: 11/567,080

(22) Filed: Dec. 5, 2006

(65) Prior Publication Data

US 2008/0133149 A1   Jun. 5, 2008

(51) Int. Cl.
    *G01M 15/14* (2006.01)
(52) U.S. Cl. .................................. 73/112.01
(58) Field of Classification Search ............. 73/112.01, 73/112.03, 112.04, 112.05, 112.06, 118.03
    See application file for complete search history.

(56) References Cited

U.S. PATENT DOCUMENTS

| 3,938,319 | A | * | 2/1976 | Thomson ..................... 60/773 |
| 5,440,895 | A |   | 8/1995 | Bahel et al. |
| 5,589,627 | A |   | 12/1996 | Sutton |
| 5,777,468 | A |   | 7/1998 | Maher |
| 6,016,465 | A |   | 1/2000 | Kelly |
| 6,208,917 | B1 |  | 3/2001 | McKissick, Jr. et al. |
| 6,595,062 | B1 | * | 7/2003 | Luke et al. ..................... 73/714 |
| 6,598,195 | B1 | * | 7/2003 | Adibhatla et al. ............ 714/745 |
| 6,772,627 | B2 | * | 8/2004 | Fleming ....................... 73/147 |
| 6,804,600 | B1 |  | 10/2004 | Uluyol et al. |
| 6,831,466 | B2 |  | 12/2004 | Down et al. |
| 6,923,051 | B2 | * | 8/2005 | Fleming ....................... 73/147 |
| 7,006,938 | B2 |  | 2/2006 | Laraia et al. |
| 2002/0193933 | A1 | * | 12/2002 | Adibhatla et al. ............ 701/100 |
| 2003/0209084 | A1 | * | 11/2003 | Fleming ................... 73/861.74 |
| 2006/0277984 | A1 | * | 12/2006 | Bleile et al. ................. 73/118.2 |

* cited by examiner

*Primary Examiner*—Eric S McCall
(74) *Attorney, Agent, or Firm*—William Scott Andes, Esq.; Armstrong Teasdale LLP

(57) ABSTRACT

A method of measuring a gas turbine engine operating parameter is provided. The method includes providing at least one engine component and a plurality of sensors, positioning each of the plurality of sensors relative to an index location, defining a periodic gas flow operating parameter distribution profile to extend across an engine component or between engine components, obtaining a gas flow operating parameter reading from each of the plurality of sensors, and determining at least one operating parameter for defining a periodic gas flow operating parameter distribution.

17 Claims, 7 Drawing Sheets

METHOD AND APPARATUS FOR SENSOR FAULT DETECTION AND COMPENSATION

STATEMENT REGARDING FEDERALLY SPONSORED RESEARCH & DEVELOPMENT

The U.S. Government may have certain rights in this invention pursuant to contract number N00019-04-C-0093.

BACKGROUND OF THE INVENTION

This invention relates generally to gas turbine engines, and more particularly, to methods for detecting and compensating for faulty sensors in gas turbine engines.

Optimal sensor placement facilitates accurately determining the average value of an operating parameter, such as the temperature of a gas path airflow. Generally, there are two known methods used to determine the optimal circumferential location of sensors positioned downstream of a gas turbine engine combustor. A first known method randomly distributes sensors circumferentially as widely as possible based on the clear space available on the engine. A second known method uses burner rig tests to simulate gas turbine engine combustor performance. A very large number of data points throughout the operating regime are recorded and analyzed to determine a set of sensor locations that optimize temperature measurements. The empirical data is used to determine an acceptable measure of the average bulk temperature of the gas flow path. However, performing the burner rig tests, and recording and analyzing the data may be an expensive and time consuming process.

These sensors are generally used together to measure an operating parameter, such as exhaust temperature, by calculating an average value, a maximum value, a minimum value, or other characteristic of the given operating parameter. Should one or more of the sensors fail, the average value of the parameter calculated using the remaining sensors may be corrupted. Generally, when a faulty sensor is detected, it is removed from the average calculation and is replaced at the next opportunity.

Removing a faulty sensor from the average calculation reduces the accuracy of the average calculation of the remaining sensors. Consequently, at least some known engines include supplemental sensors so that the average measurement is minimally impacted when a sensor fails. The degree to which the system measurement is impacted is proportional to the number of remaining functional sensors, i.e., the more functional sensors remaining, the less impact to the system. Moreover, removing a faulty sensor from the average calculation increases costs and sensor system complexity, inherently increases the failure rate of sensors, and may lead to increased measurement error.

Other known detection methods do not compensate for a faulty sensor, but rather compute the average using n−1 sensors. Alternately, other known detection methods may replace the sensor value with a recent historical value. Failing sensors introduce a more complex compensation process because of the difficulty in determining whether a sensor has started failing, or is drifting. As the sensor begins to drift, the averaging process attenuates its impact.

BRIEF DESCRIPTION OF THE INVENTION

In one aspect, a method of measuring a gas turbine engine operating parameter is provided. The method includes providing at least one engine component and a plurality of sensors, positioning each of the plurality of sensors relative to an index location, defining a periodic gas flow operating parameter distribution profile to extend across an engine component or between engine components, obtaining a gas flow operating parameter reading from each of the plurality of sensors, and determining at least one operating parameter for defining a periodic gas flow operating parameter distribution.

In another aspect, a system for measuring a gas turbine engine operating parameter is provided. The system includes at least one engine component and a plurality of sensors, each of the plurality of sensors is positioned relative to an index location, and a controller including a processor and a memory, the controller configured to receive gas flow operating parameter readings from each of the plurality of sensors, and determine at least one operating parameter for defining a periodic gas flow operating parameter distribution.

In yet another aspect, an apparatus including at least one engine component and a plurality of sensors is provided. The plurality of sensors is positioned relative to an index location, and a periodic gas flow temperature distribution profile extends across an engine component or between engine components. The apparatus also includes a controller including a processor and a memory, the controller is configured to receive gas flow temperature readings from each of the plurality of sensors and determine at least one operating parameter for defining a periodic gas flow operating parameter distribution.

DETAILED DESCRIPTION OF THE INVENTION

Figure 1:
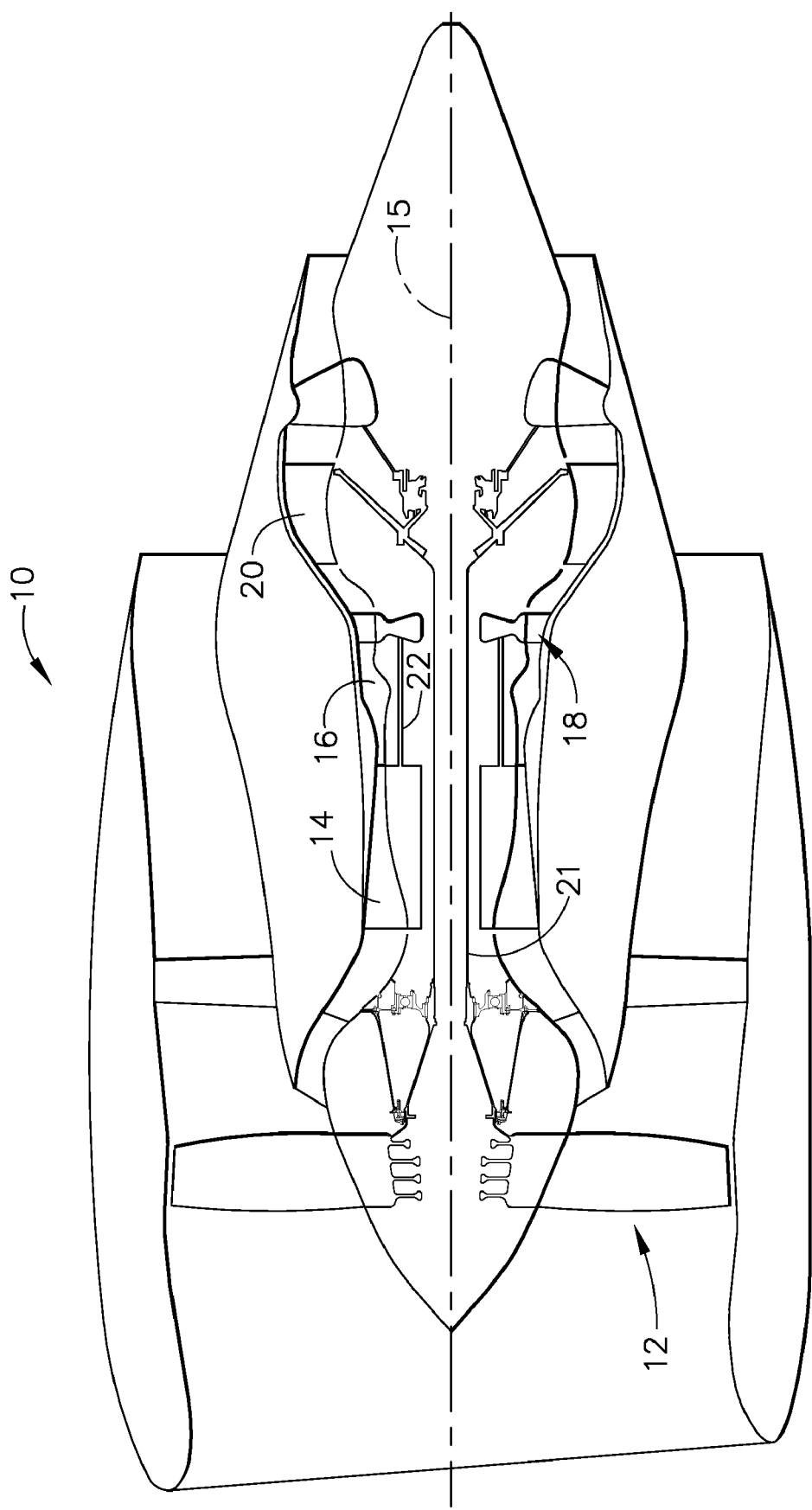
FIG. 1 is schematic illustration of an exemplary gas turbine engine including a fan containment case.

FIG. 1 is a schematic illustration of an exemplary gas turbine engine 10. Engine 10 includes a low pressure compressor 12, a high pressure compressor 14, and a combustor assembly 16. Engine 10 also includes a high pressure turbine 18, and a low pressure turbine 20 arranged in a serial, axial flow relationship. Compressor 12 and turbine 20 are coupled by a first shaft 21, and compressor 14 and turbine 18 are coupled by a second shaft 22. In the exemplary embodiment, gas turbine engine 10 is a CFM56 gas turbine engine or a CF34-10 gas turbine engine that are each commercially available from General Electric Company, Cincinnati, Ohio. It should be appreciated that in other embodiments, gas turbine engine 10 may be any gas turbine engine containing similar components, such as the F136 engine or a marine/industrial engine such as the LM6000, also available from the General Electric Company.

During operation, air flows along a central axis 15, and compressed air is supplied to high pressure compressor 14. The compressed air is delivered to combustor 16. Airflow (not shown in FIG. 1) from combustor 16 drives turbines 18 and 20, and turbine 20 drives low pressure compressor 12 by way of shaft 21.

Figure 2:
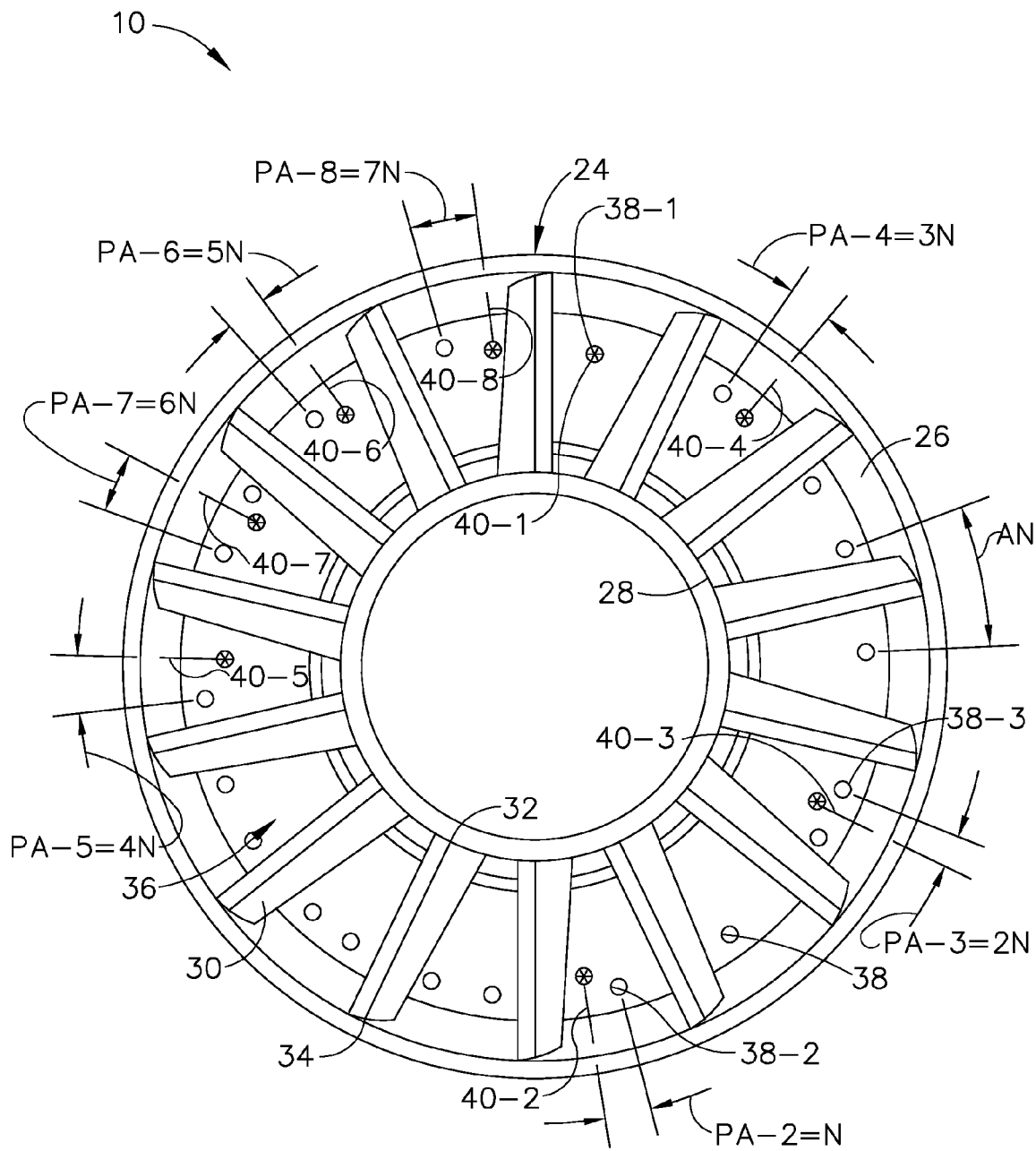
FIG. 2 is a schematic illustration of a rear view of the gas turbine engine shown in FIG. 1.

FIG. 2 is a schematic illustration of a rear view of gas turbine engine 10, including a turbine rear frame (TRF) 24. TRF 24 is downstream from combustor 16 (shown in FIG. 1). More specifically, TRF 24 includes a radial outer surface 26, a radial inner surface 28, and a plurality of turbine frame struts 30. Each strut 30 has a first end 32 coupled to inner surface 28 and a second end 34 coupled to outer surface 26. In the exemplary embodiment, struts 30 are uniformly circumferentially-spaced about TRF 24, such that a plurality of substantially identical strut sectors 36 are defined between circumferentially-adjacent pairs of struts 30, surface 26 and surface 28. A plurality of nozzles 38 in combustor 16 are radially aligned with strut sectors 36 such that at least one nozzle 38 is positioned within each strut sector 36. In the exemplary embodiment, nozzles 38 are uniformly circumferentially-spaced apart at an angle AN about TRF 24. Angle AN is determined by dividing the circumference of radial surface 26, that is, three-hundred-sixty degrees, by the number of fuel nozzles 38.

Each sensor 40 is positioned within a different strut sector 36 such that sensors 40 optimize gas flow temperature measurements. It should be appreciated that the exemplary embodiment includes eight temperature sensors 40, labeled as 40-1 to 40-8 in FIG. 2, and twenty fuel nozzles 38. It should be appreciated that although the exemplary embodiment includes twenty fuel nozzles 38 and eight temperature sensors 40, other embodiments may include any number of nozzles 38 and any number of sensors 40 that facilitate engine 10 functioning as described herein. Moreover, it should be appreciated that in the exemplary embodiment, fuel nozzles 38 each perform substantially identically and that the circumferential fuel burn temperature at a given radius approximates a repeating pattern, such as a sinusoidal profile (shown in FIG. 3), between nozzles 38. Furthermore, it should be appreciated that although the exemplary embodiment includes sensors 40 for detecting temperature and locates sensors 40 downstream of nozzles 38, in other embodiments, sensors 40 may be used to measure any gas turbine engine 10 operating parameter, such as, but not limited to, temperature and pressure, and may be located in any area of gas turbine engine 10, such as, but not limited to, upstream from combustor 16, that facilitates engine 10 to function as described herein.

Each sensor 40-1 to 40-8 is positioned with respect to a nozzle 38 using multiples of an incremental angle N. Incremental angle N is the effective angle between each pair of sensors 40 and is determined by dividing angle AN by the number of sensors 40. In the exemplary embodiment, a first sensor 40-1 is positioned substantially coincident with a first nozzle 38-1. Moreover, in the exemplary embodiment, first nozzle 38-1 defines a primary index location and is substantially centered within a strut sector 36 between a pair of struts 30. It should be appreciated that although the exemplary embodiment is described as using a primary index nozzle 38-1 substantially centered within a strut sector 36, in other embodiments, any nozzle 38 may be designated as the primary index location, even if that nozzle 38 is not necessarily centered within a strut sector 36, provided that nozzle 38 facilitates sensors 40 to be positioned as described herein. Furthermore, it should be appreciated that although the exemplary embodiment is described as using a nozzle 38 to identify the primary index location, in other embodiments, any engine components circumferentially and periodically arranged within gas turbine engine 10 may be used to identify the primary index location. A second sensor 40-2 is positioned at a multiple of incremental angle N clockwise from a second nozzle 38-2. A third sensor 40-3 is positioned at twice incremental angle N clockwise from a third nozzle 38-3. It should be appreciated that each sensor 40 is positioned clockwise with respect to nozzle 38 and is positioned in a different strut sector 36, using a positioning angle, PA-M, determined according to the following formula:

$$PA\text{-}M = (M-1) \times N, \qquad (1)$$

where M is an incremental multiple corresponding to one of sensors 40-1 to 40-8. In the exemplary embodiment, each positioning angle PA-M is measured with respect to a nearest adjacent nozzle 38. For example, for first sensor 40-1, M=1, so positioning angle PA-1 is zero. Thus, first sensor 40-1 is positioned substantially coincident with the nearest nozzle, 38-1. For second sensor 40-2, M=2, so positioning angle PA-2 is N degrees away from the nearest nozzle 38, which is 38-2. For third sensor 40-3, M=3, so positioning angle PA-3 is 2N degrees away from the nearest nozzle 38, which is 38-3. The positioning angle PA-M is computed similarly for each sensor 40. Thus, each subsequent sensor 40 is optimally positioned with respect to the nearest nozzle 38. It should be appreciated that although the exemplary embodiment uses equation (1) to determine the positioning angle PA-M of each sensor 40, other embodiments may use any equation or mathematical relationship that facilitates positioning sensors 40 as described herein.

Generally, the physical constraints of TRF 24 facilitate preventing sensors 40 from being positioned with respect to the same nozzle 38. Consequently, as discussed above, sensors 40 are each positioned with respect to the nearest nozzle 38, and are not necessarily positioned with respect to the same nozzle 38, that accommodates the required positioning angle PA-M. It should be appreciated that sensors 40 are not necessarily positioned sequentially about the circumference of TRF 24.

In the exemplary embodiment, the gas flow temperature distribution between any two nozzles 38 is substantially identical. It should be understood that any periodic gas flow distribution shape, or profile, between nozzles 38 may be modeled. Generally, to generate a model, a series of data points are collected for an operating parameter, such as, but not limited to, temperature and pressure, and a curve is chosen to fit through the data points. These curves are commonly known as a curve-fit. The model is a mathematical representation that simulates the chosen curve. In one embodiment, the temperature distribution is modeled to be sinusoidally-shaped, and the model, mathematically, is a sinusoidal function. In the exemplary embodiment, a minimum of three data points are required to generate a sinusoidal curve and associated mathematical model. It should be appreciated that although the exemplary embodiment is described as using a sinusoidally-shaped curve and associated model, in other embodiments, the curve may have any shape, such as, but not limited to, a trapezoidal shape and associated model, that facilitates determining sensor locations and operating parameters as described herein. Moreover, it should be appreciated that although the exemplary embodiment requires a minimum of three data points to define the sinusoid, in other embodiments, any other type of curve may be chosen and the corresponding number of data points required to mathematically define the curve will vary, depending on the curve. Because the gas flow temperature distribution is substantially identical between any pair of nozzles 38, positioning each sensor 40 with respect to a nozzle 38 effectively positions each sensor 40 with respect to index location 38-1. In the exemplary embodiment, sensors 40 considered relative to index location 38-1, collectively define a sinusoidal sampling model that mimics the sinusoidal gas flow temperature distribution between any pair of nozzles 38. Thus, sensors 40 are positioned to create a distribution of sensors 40 that is mathematically distributed by a geometrical method of distribution. Although the exemplary embodiment is described as positioning sensors 40 clockwise with respect to the index location 38-1, in other embodiments, sensors 40 may be positioned counterclockwise with respect to index location 38-1, and/or sensors 40 may be positioned both clockwise and counterclockwise from indexing nozzle 38-1. It should be appreciated that in the exemplary embodiment, sensors 40 are substantially identical and are capable of taking measurements over the same length of the gas flow path downstream from combustor 16.

Figure 3:
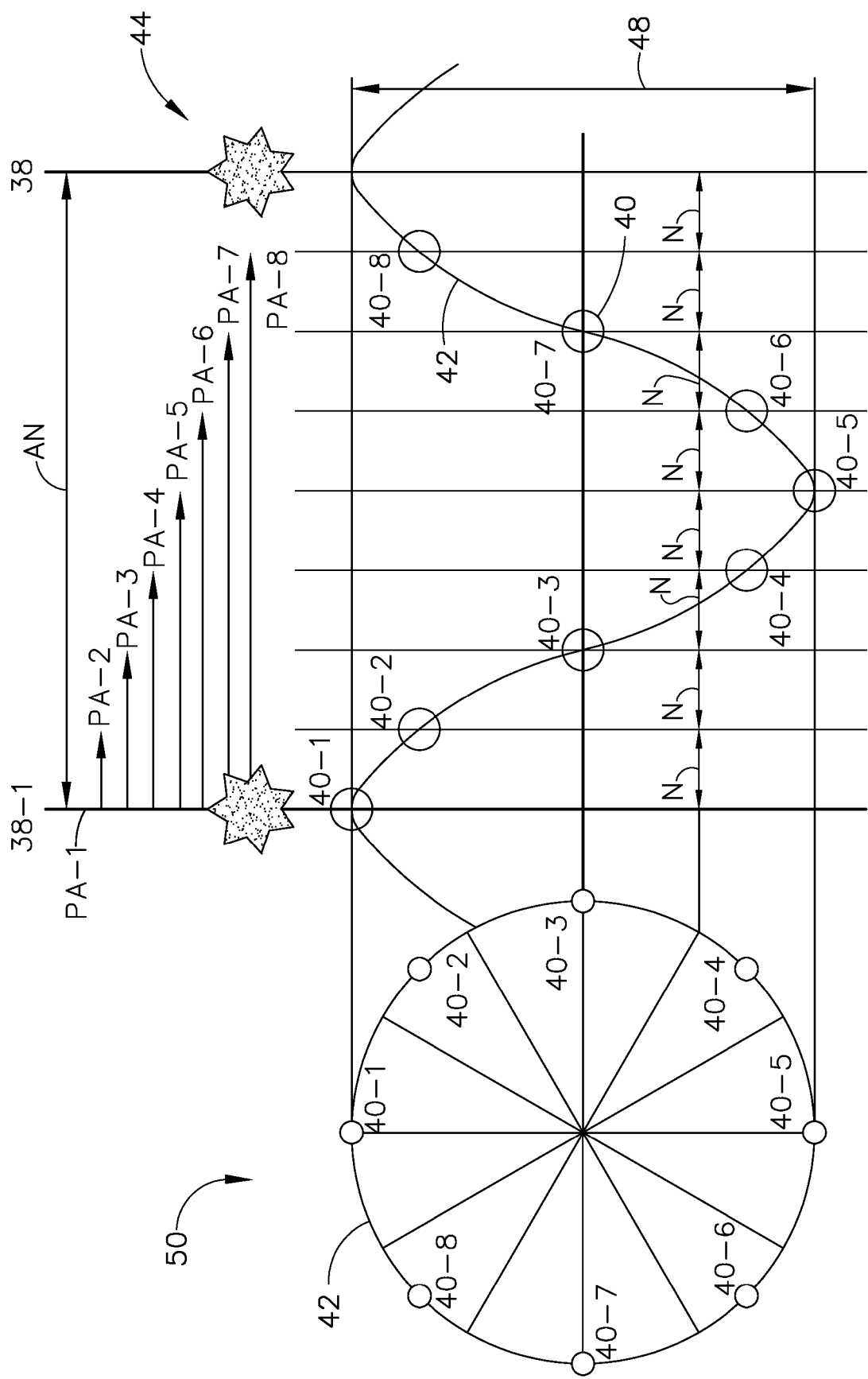
FIG. 3 is a diagram illustrating a sinusoidal temperature distribution between nozzles.

The information shown in FIG. 3 is the same information shown in FIG. 2, but shown in a different format, as described in more detail below. As such, components and mathematical relationships illustrated in FIG. 3 that are identical to components and mathematical relationships illustrated in FIG. 2, are identified using the same reference numerals used in FIG. 2.

FIG. 3 illustrates a graph 44 illustrating an exemplary sinusoidal gas flow temperature distribution between primary index location 38-1 and a circumferentially-adjacent nozzle 38. More specifically, graph 44 includes a sinusoidal gas flow temperature distribution profile 42 modeling the gas flow temperature distribution between each pair of circumferentially-adjacent nozzles 38, and includes effective positions of sensors 40-1 to 40-8 with respect to primary index location 38-1. It should be appreciated that in the exemplary embodiment, the gas flow temperature distribution profile 42 is substantially similar between each pair of circumferentially-adjacent nozzles 38 and is sinusoidally-shaped. Peaks of sinusoidal profile 42 correspond to maximum gas flow temperatures and troughs of profile 42 correspond to minimum gas flow temperatures. Sensors 40-1 to 40-8 are effectively positioned with respect to index location 38-1, such that collectively, sensors 40-1 to 40-8 define a sinusoidal pattern that mimics sinusoidal temperature distribution profile 42 between each pair of nozzles 38.

It should be understood that upon exiting nozzles 38, the gas flow may twist or swirl such that sinusoidal temperature distribution profile 42 shifts so it is not centered between nozzles 38. It should be appreciated that shifting sinusoidal profile 42 does not adversely affect the average gas flow temperature computations because the method discussed herein uses gas flow temperature samples across the entire sinusoidal profile 42, regardless of where profile 42 starts or where profile 42 ends. Moreover, it should be appreciated that although the exemplary embodiment is described as modeling a sinusoidally-shaped temperature distribution profile 42, in other embodiments, temperature distribution profile 42 may be modeled to have any periodic shape, such as, but not limited to, a trapezoidal shape, that facilitates positioning sensors 40 as described herein. Furthermore, it should be appreciated that in other embodiments temperature distribution profile 42 may be modeled using tables containing a series of values that define one or more temperature distribution profile 42 shapes. These values represent locations on profile 42 and together define a periodic shape. Further, it should be appreciated that additional table values, or profile 42 locations, may be determined through interpolation.

Graph 44 also includes angle AN and effective positioning angles PA-1 to PA-8 for each sensor 40-1 to 40-8 relative to primary index location 38-1. Moreover, graph 44 includes incremental angle N between sensors 40 and the temperature range 48 from the maximum to the minimum temperature. A circular representation 50 of sinusoidal temperature distribution profile 42, between primary index location 38-1 and a subsequent nozzle 38, shows the geometric relationship between sensors 40-1 to 40-8. It should be appreciated that in the exemplary embodiment angle AN is not 360 degrees. As shown in representation 50, for computational purposes, the angle between nozzles 38 is represented by the circumference of profile 42 and is 360 degrees.

Figure 4:
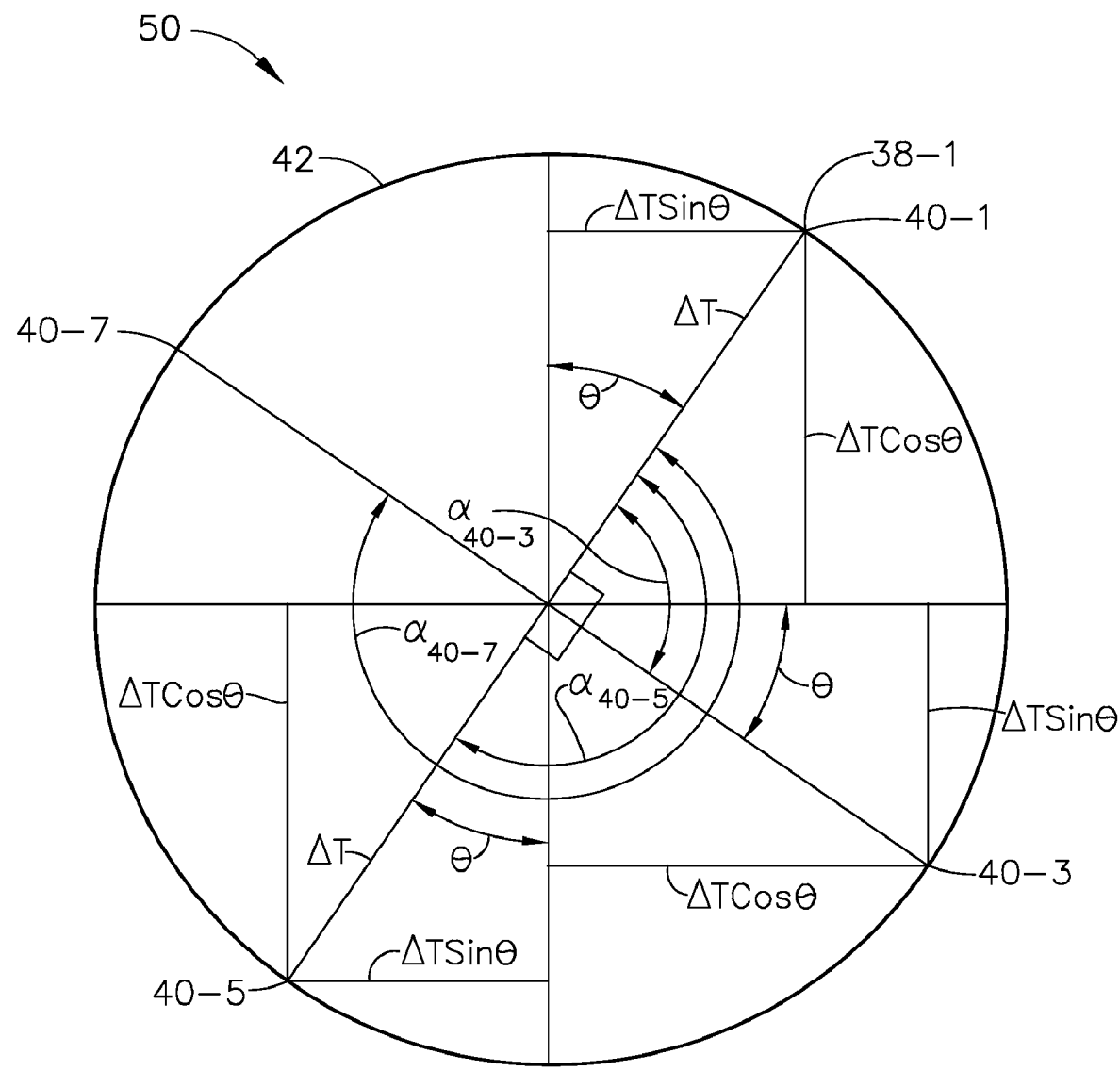
FIG. 4 is a diagram illustrating an exemplary geometric relationship between four sensors.

FIG. 4 is a diagram illustrating an exemplary geometric relationship between four sensors 40 using a circular representation 50 of sinusoidal temperature distribution profile 42. More specifically, in the exemplary embodiment, the four sensors 40 shown in FIG. 4 correspond to sensors 40-1, 40-3, 40-5 and 40-7 shown in FIG. 3. It should be understood that circular representation 50 is similar to that shown in FIG. 3, except that temperature distribution profile 42 is rotated by a swirl angle θ and that only four sensors 40-1, 40-3, 40-5 and 40-7 are included. It should be understood that profile 42 does not represent TRF 24 shown in FIG. 2.

Sinusoidally positioning sensors 40 on gas flow temperature distribution profile 42 facilitates determining a trigonometric solution to the apparent value of a failed sensor 40, a failing sensor 40, or an incorrectly positioned sensor 40. Given the geometric relationship of sensors 40 to the geometry of engine 10, a minimum of three sensors 40 are required to calculate the total temperature range and average temperature of the gas flow. In the exemplary embodiment, four sensors 40-1, 40-3, 40-5 and 40-7 are positioned approximately ninety degrees apart on sinusoidal temperature profile 42. It should be appreciated that three hundred sixty degrees on profile 42 corresponds to the subtended angle between two consecutive nozzles 38, angle AN, as shown in FIG. 2. Sensor 40-1 is positioned at primary index location 38-1 corresponding to the peak temperature location. Sensor 40-3 is positioned at an angular distance from nozzle 38 equal to approximately one-quarter of the circumference of profile 42 and corresponds to the average temperature location. Sensor 40-5 is positioned at an angular distance from nozzle 38 equal to approximately half of the circumference of profile 42 and corresponds to the minimum temperature location. Sensor 40-7 is positioned at an angular distance equal to approximately three quarters of the circumference of profile 42 and also corresponds to the average temperature location. The temperature readings for sensors 40-1, 40-3, 40-5 and 40-7 are trigonometrically related to each other as indicated below:

$$T_{40\text{-}1} = T_{mean} + \Delta T^* \cos(\alpha_{40\text{-}1} + \theta); \tag{1a}$$

$$T_{40\text{-}3} = T_{mean} + \Delta T^* \cos(\alpha_{40\text{-}3} + \theta); \tag{1b}$$

$$T_{40\text{-}5} = T_{mean} + \Delta T^* \cos(\alpha_{40\text{-}5} + \theta); \tag{1c}$$

$$T_{40\text{-}7} = T_{mean} + \Delta T^* \cos(\alpha_{40\text{-}7} + \theta); \tag{1d}$$

where, α is the angle of each sensor 40-1, 40-3, 40-5 and 40-7 on profile 42 relative to primary index location 38-1, $T_{mean}$ is the mean or average temperature, $\Delta T$ is half the difference between maximum and minimum temperatures, and θ is an unknown swirl angle. $T_{mean}$ is determined by computing a regression solving X simultaneous equations for the three unknowns, $T_{mean}$, $\Delta T$ and θ, where X is the number of sensors 40. Assuming all sensors 40-1, 40-3, 40-5 and 40-7 are properly functioning, the average temperature can also be computed using the following formula:

$$\text{Average} = (T_{40\text{-}1} + T_{40\text{-}3} + T_{40\text{-}5} + T_{40\text{-}7})/4. \tag{2}$$

In the exemplary embodiment, sensors 40 are identified as incorrectly functioning by input signal processing logic using methods, such as, but not limited to, range, rate, or modelcomparison tests. It should be understood that sensors 40 determined to be incorrectly functioning include those sensors 40 that generate inaccurate temperature readings and those sensors 40 that do not generate any readings. After identifying an incorrectly functioning sensor 40, three of equations 1a, 1b, 1c and 1d are solved. More specifically, those equations corresponding to the remaining three properly functioning sensors 40, are solved in the three unknowns. For example, when sensor 40-7 fails equations 1a, 1b and 1c are solved for $T_{mean}$, $\Delta T$, and $\theta$. More generally, $T_{mean}$, $\Delta T$, and $\theta$ are determined using a regression to solve the (X−1) equations in the three unknowns. It should be appreciated that in the exemplary embodiment, a minimum of three correctly functioning sensors 40 are required to reconstruct the temperature readings of an incorrectly functioning sensor 40. To solve for the three unknowns, $T_{mean}$, $\Delta T$, and $\theta$, equations 1a, 1b and 1c are rewritten, by taking advantage of the fact that the sensors 40 are at $\alpha$ values of 0°, 90°, and 180°, as follows:

$$T_{40\text{-}1} = T_{mean} + \Delta T^* \{\cos \alpha_{40\text{-}1} \cos \theta - \sin \alpha_{40\text{-}1} \sin \theta\} = T_{mean} + \Delta T \cos \theta \quad (3a)$$

$$T_{40\text{-}3} = T_{mean} + \Delta T^* \{\cos \alpha_{40\text{-}3} \cos \theta - \sin \alpha_{40\text{-}3} \sin \theta\} = T_{mean} - \Delta T \sin \theta \quad (3b)$$

$$T_{40\text{-}5} = T_{mean} + \Delta T^* \{\cos \alpha_{40\text{-}5} \cos \theta - \sin \alpha_{40\text{-}5} \sin \theta\} = T_{mean} - \Delta T \cos \theta \quad (3c)$$

Solving equations (3a) and (3b) simultaneously yields the following two equations:

$$\Delta T \cos \theta = T_{40\text{-}1} - T_{mean}; \text{ and} \quad (4a)$$

$$\Delta T \sin \theta = T_{mean} - T_{40\text{-}3}. \quad (4b)$$

Dividing equation (4b) by (4a) yields the following equation:

$$\theta = \tan^{-1} \{(T_{mean} - T_{40\text{-}3})/(T_{40\text{-}1} - T_{mean})\}. \quad (5)$$

Adding equations (3a) and (3c) yields $$T_{mean} = (T_{40\text{-}1} + T_{40\text{-}5})/2. \quad (6)$$

Substituting the results for $\theta$ and $T_{mean}$ from equations (5) and (6) into equation (4a), yields:

$$\Delta T = (T_{40\text{-}1} - T_{mean})/\cos \theta. \quad (7)$$

After calculating $\theta$, $T_{mean}$, and $\Delta T$ from equations (5), (6), and (7), the temperature at any other circumferential location on temperature distribution profile 42 can be determined. Consequently, the proper temperature reading for an incorrectly functioning sensor 40-7 may be reconstructed by substituting the solved values of $\theta$, $T_{mean}$, and $\Delta T$ into equation (1d). It should be appreciated that any three correctly functioning sensors 40 of sensors 40-1, 40-3, 40-5 and 40-7, may be used to reconstruct the proper temperature reading of a fourth incorrectly functioning sensor 40. Moreover, it should be appreciated that although the exemplary embodiment includes four sensors 40, other embodiments may use any number of sensors 40 that enables reconstructing the reading of an incorrectly functioning sensor 40 as described herein. Furthermore, it should be appreciated that, regardless of the total number of sensors 40, a minimum of three correctly functioning sensors 40 are required to reconstruct the temperature reading of any incorrectly functioning sensor 40 when the temperature distribution between nozzles 38 is sinusoidal.

When a number "n" of sensors 40 are effectively positioned to lie along a sinusoidally-shaped temperature distribution representing the temperature variation between fuel nozzles 38, and one sensor 40 begins to incorrectly function, the remaining sensors 40 may be used to reconstruct the proper temperature reading of an incorrectly functioning sensor 40 and for computing the average temperature. Thus, the average temperature may be computed using the remaining "n−1" sensors 40, not by taking an average of the remaining "n−1" sensors 40, but rather by mathematically computing a temperature average. Likewise, when more than one sensor 40 incorrectly functions, the remaining sensors 40 may be used to calculate a temperature average that is mathematically equivalent to the temperature average of the original "n" sensors.

Alternatively, the correct temperature reading of an incorrectly functioning sensor 40 may merely be read or taken from the model. More specifically, the average, minimum and maximum temperatures may be directly taken from the model. For example, referencing FIG. 3, the maximum temperature is shown at 40-1, the average temperature is shown at 40-3 and the minimum temperature is shown at 40-5.

For incorrectly positioned sensors 40, the average, minimum and maximum temperatures may also be taken directly from a model. More specifically, the locations of incorrectly positioned sensors 40 are incorporated into the regression fit to the model. That is, the model is generated to simulate a curve that passes through the temperature data points generated by the incorrectly positioned sensors 40. This model is also substantially identical to profile 42 shown in FIG. 3, the only difference is that the data points do not lie directly at the average, minimum and maximum locations. Consequently, the average, minimum and maximum temperatures may also be directly read from the model.

A sensor 40 whose performance is starting to degenerate may also be identified by using the geometric relationship between sensors 40 and the geometry of engine 10. Because the temperature reading of each sensor 40 is related to the other sensors 40 due to the sinusoidal nature of the temperature distribution profile 42, each sensor 40 has an expected value that may be determined using the model. In the exemplary embodiment, the expected value is based on the model used for all of the sensors 40. When one of the sensors 40 begins to incorrectly function and drifts away from its model value, the drift is detected by determining a difference between the reading of a sensor 40 and the value obtained from the model. A pair of threshold values are defined, wherein one defines a threshold value above the model temperature and one defines a threshold value below the model temperature, based on the accuracy of the model. Thus, the threshold values define an acceptable margin of error, or a tolerance, about the curve-fit. The threshold values are used to determine whether a sensor 40 is properly functioning, partially failing and drifting, or completely failing. More specifically, when a sensor 40 temperature reading is beyond its threshold values, it is considered malfunctioning and the other sensors 40 may be used to reconstruct its temperature reading.

Figure 5:
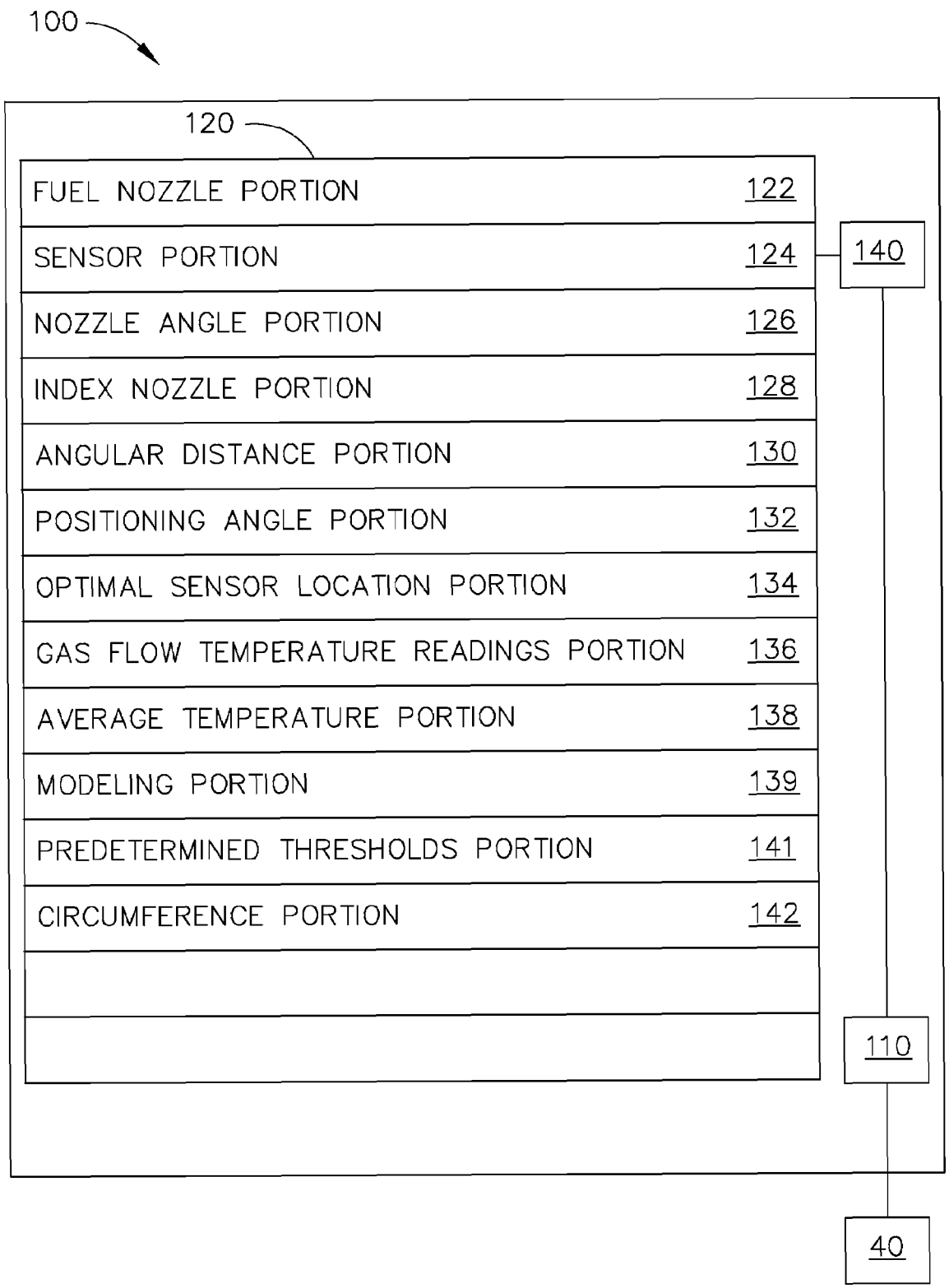
FIG. 5 is a block diagram illustrating an exemplary control logic and system controller.

FIG. 5 is a block diagram illustrating an exemplary control logic and system controller 100 for use in determining optimal sensor 40 positions, and detecting and compensating for faulty sensors 40. In the exemplary embodiment, controller 100 includes an input/output circuit 110, a memory 120 and a processing circuit 140. Controller 100 communicates with a plurality of sensors 40.

It should be understood that each of the circuits shown in FIG. 5 can be implemented as portions of a suitably programmed general purpose processor. As used herein, the term "processor" may include any programmable system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "processor".

The input/output interface circuit 110 receives signals transmitted to controller 100 from gas flow temperature monitoring sources, such as sensors 40. In this exemplary embodiment, controller 100 receives electrical signals from sensors 40 that represent the temperature of the gas flow at a plurality of positions between nozzles 38. Additionally, input/output interface circuit 110 outputs signals produced by controller 100.

The memory 120 can include one or more of a fuel nozzle portion 122, a sensor portion 124, a nozzle angle portion 126, an index position nozzle portion 128, an incremental angular distance portion 130, a positioning angle portion 132, an optimal sensor location portion 134, a gas flow temperature readings portion 136, an average temperature portion 138, a modeling portion 139, a predetermined threshold portion 141, and a circumference portion 142. The fuel nozzle portion 122 and sensor portion 124 store the number of nozzles 38 and sensors 40, respectively. The nozzle angle portion 126 stores angle AN. The index nozzle portion 128 stores the location of primary index nozzle 38-1. The incremental angular distance portion 130 stores angle N. The angular distance portion 132 stores positioning angles PA-M. The optimal sensor location portion 134 stores the positions of sensors 40. The gas flow temperature readings portion 136 stores the readings of each sensor 40, the average temperature portion 138 stores the computed average temperature, the modeling portion 139 stores the value of each sensor 40 as determined by the model, the predetermined threshold portion 141 stores the acceptable margins of error about the model values and the circumference portion 142 stores the circumference of profile 42.

Memory 120 can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disk and disk drive, a writeable or re-writeable optical disk and disk drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disk, such as a CD-ROM or DVD-ROM disk, and disk drive or the like.

In this exemplary embodiment, processing circuit 140 determines sensor 40 positions and re-constructs the correct temperature reading of a faulty sensor 40 using temperature readings of other sensors 40 and the geometry between sensors 40 and engine 10.

Figure 6:
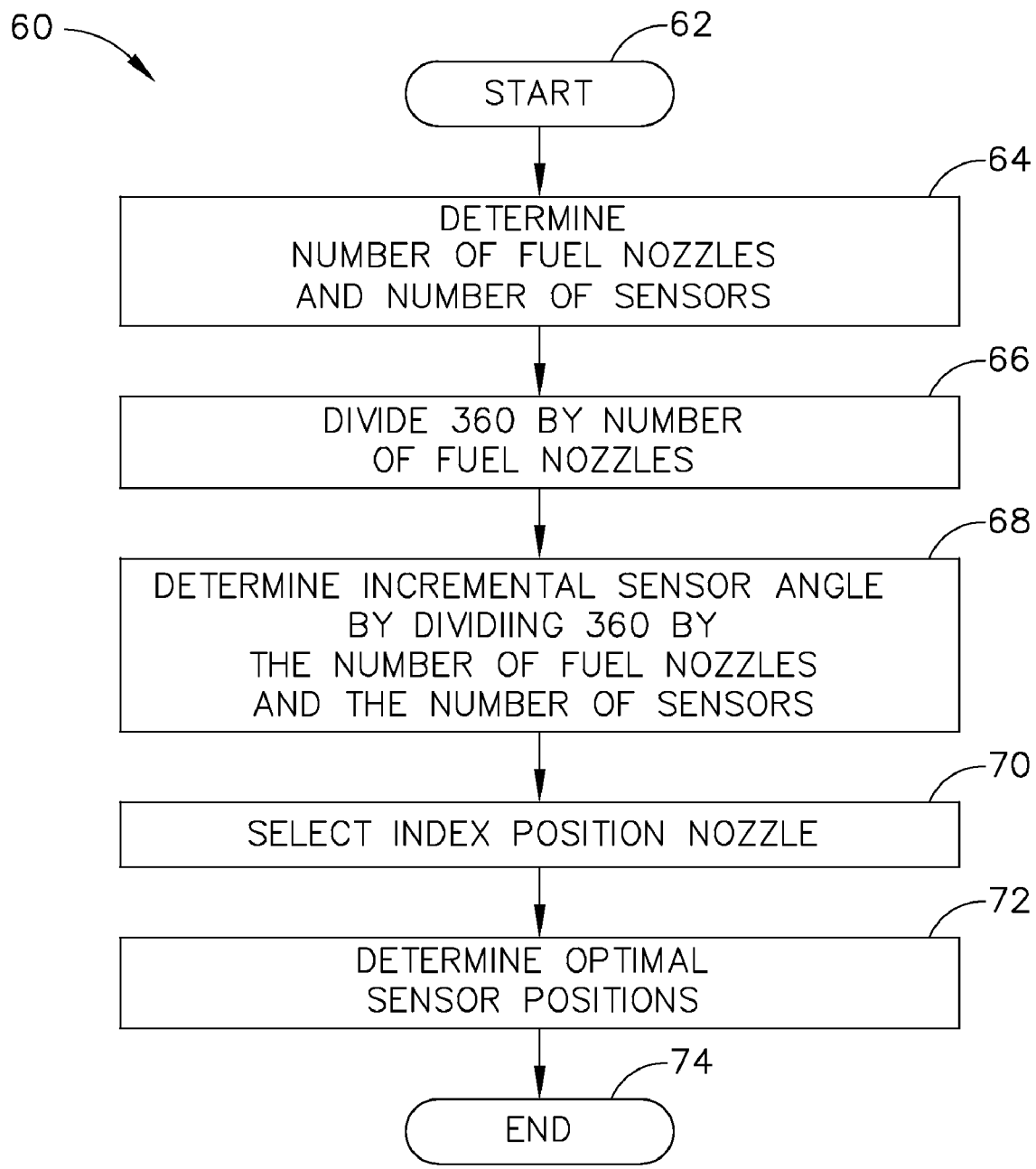
FIG. 6 is a flowchart illustrating an exemplary method for determining optimal sensor locations.

FIG. 6 is a flowchart 60 illustrating an exemplary method for determining the positions of sensors 40. The method starts 62 by establishing 64 the number of fuel nozzles 38 in combustor 16 and the number of sensors 40 required for a particular gas turbine engine 10 design. The number of fuel nozzles 38 and the number of sensors 40 are stored in portions 122 and 124, respectively, of memory 120. After establishing the number of fuel nozzles 38 and the number of sensors 40, an angle AN subtended between adjacent nozzles 38 is determined 66 by dividing the circumference of radial surface 26, that is, three-hundred-sixty degrees, by the number of fuel nozzles 38. The incremental angle N is determined 68 by dividing angle AN by the number of sensors 40. A primary index location 38-1 is determined 70 and the optimal positions of sensors 40 are determined 72 using positioning angles PA-M relative to index location 38-1. After determining 72 the optimal positions of sensors 40, the method ends 74.

Figure 7:
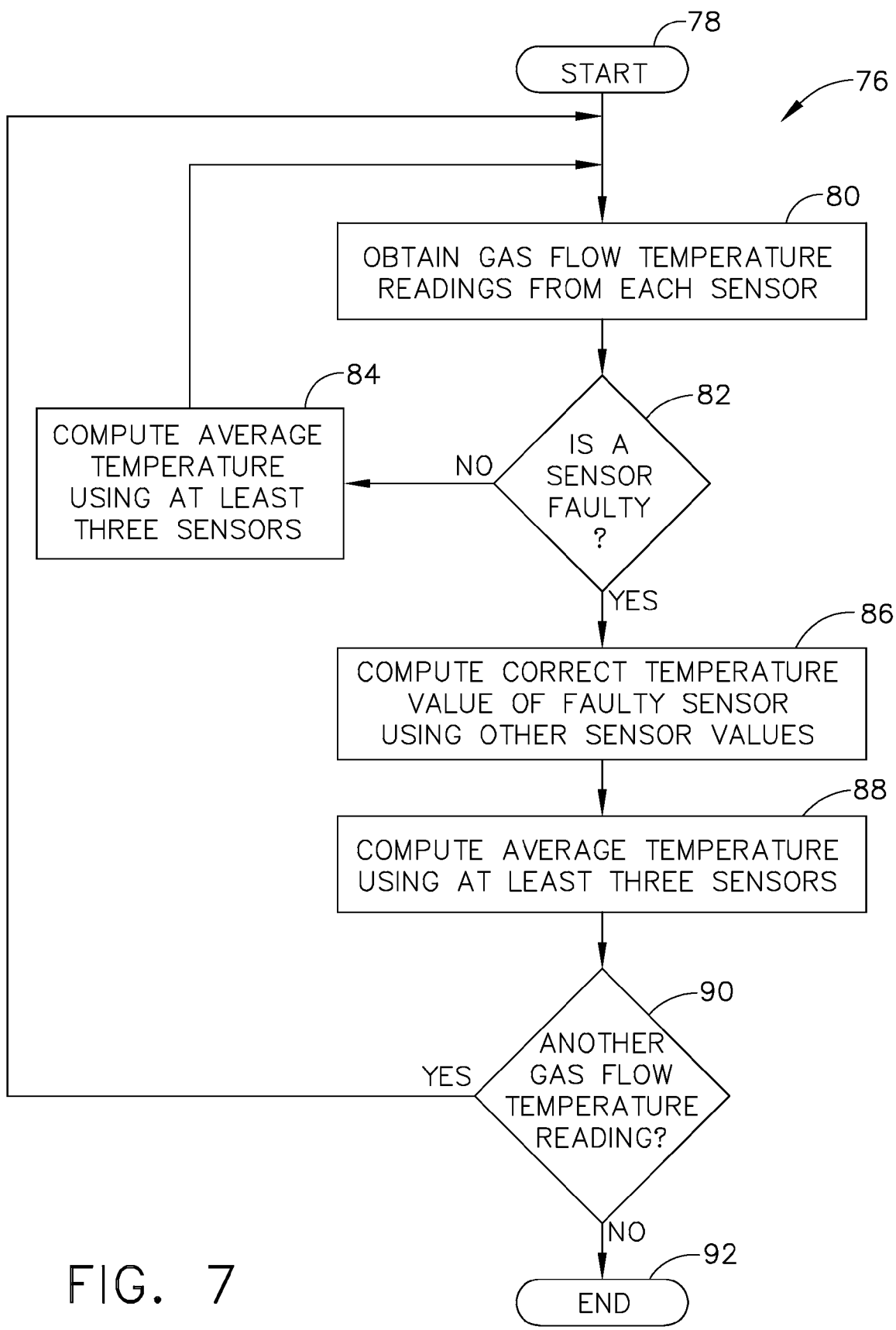
FIG. 7 is a flowchart illustrating an exemplary method for detecting and compensating for faulty sensors.

FIG. 7 is a flowchart 76 illustrating an exemplary method of detecting and compensating for incorrectly functioning sensors 40. The method starts 78 by obtaining 80 gas flow temperature readings from each sensor 40. After obtaining 80 the gas flow temperature readings, each sensor 40 is checked to verify it is correctly functioning 82. More specifically, each sensor reading is compared against a corresponding temperature value determined using the model. When the reading of a sensor 40 does not agree with the model value, the sensor reading is compared against the two thresholds that define an acceptable margin of error, or tolerance, about the model. If the sensor reading is within the acceptable margin of error, then an average temperature is computed 84 and additional readings are obtained 80. Otherwise, sensor 40 is identified as incorrectly functioning, and the geometric relationship between the remaining properly functioning sensors 40 and the geometry of engine 10 may be used to reconstruct 86 the temperature reading of the incorrectly functioning sensor 40. The average temperature is then computed 88 using the reconstructed reading. If additional gas flow temperature readings are required 90, they are obtained 80 from sensors 40. Otherwise the method ends 92.

In each embodiment, the above-described methods for optimally positioning sensors, and detecting and compensating for faulty sensors, facilitate reducing the time and labor required for accurate sensor analysis of any engine configuration and facilitates accurately measuring the average gas flow path temperature. More specifically, the sensors are optimally positioned by using a ratio reflecting the number of nozzles and the number of sensors, and faulty sensors are detected and compensated for by using geometric relationships between sensors. As a result, gas turbine engine operation facilitates reducing time and costs associated with generating and analyzing engine data, and facilitates compensating for faulty sensors. Accordingly, gas turbine engine performance and component useful life are each facilitated to be enhanced in a cost effective and reliable manner.

Exemplary embodiments of methods for optimally locating sensors and detecting and compensating for faulty sensors are described above in detail. The methods are not limited to use with the specific gas turbine engine embodiments described herein, but rather, the methods can be utilized independently and separately from other methods described herein. For example, the optimal placement of existing sensors can be determined and compared to actual sensor locations. Knowing the distance each sensor is from optimal placement facilitates making software corrections to the data measurements, thus improving the calculated gas flow temperature average values. Moreover, the invention is not limited to the embodiments of the methods described above in detail. Rather, other variations of the methods may be utilized within the spirit and scope of the claims.

While the invention has been described in terms of various specific embodiments, those skilled in the art will recognize that the invention can be practiced with modification within the spirit and scope of the claims.

What is claimed is:

1. A method of measuring a gas turbine engine operating parameter, said method comprising:
   providing at least one engine component and a plurality of sensors;

positioning each of the plurality of sensors relative to an index location;

defining a periodic operating parameter distribution profile to extend across an engine component or between engine components;

receiving an operating parameter value from each of the plurality of sensors;

comparing each operating parameter value against the periodic gas flow operating parameter distribution;

determining if one or more of the plurality of sensors has failed; and determining an operating parameter value for the failed sensor using the operating parameter distribution profile and the received operating parameter values.

2. A method in accordance with claim 1 wherein defining a gas flow operating parameter distribution profile further comprises generating a model to simulate a curve passing through at least one operating parameter data point from at least one incorrectly positioned sensor.

3. A method in accordance with claim 1 further comprising reconstructing a proper temperature reading value for an incorrectly functioning sensor using remaining functioning sensors of the plurality of sensors.

4. A method in accordance with claim 1 further comprising identifying which of the plurality of sensors is not functioning correctly when the value corresponding to that sensor is not within the predetermined threshold.

5. A method in accordance with claim 1 wherein defining a periodic gas flow operating parameter distribution profile includes computing an average and a maximum value of the operating parameter, and wherein temperature is the operating parameter.

6. A method in accordance with claim 1 further comprising reconstructing an incorrect sensor value using geometric relationships between each of the plurality of sensors and the engine geometry.

7. A method in accordance with claim 1 wherein defining a periodic gas flow operating parameter distribution profile further comprises defining a sinusoidal temperature distribution profile using at least three correctly functioning sensors.

8. A method in accordance with claim 1 further comprising defining temperature as the operating parameter and determining the gas flow temperature at a location on a gas flow temperature distribution profile by calculating a mean temperature, a swirl angle and a temperature range.

9. A system for measuring a gas turbine engine operating parameter, said system comprising:

at least one engine component and a plurality of sensors, each of said plurality of sensors is positioned relative to an index location; and a controller comprising a processor and a memory, said controller configured to receive gas flow operating parameter values from each of said plurality of sensors, to determine at least one engine operating parameter for use in defining a periodic gas flow operating parameter distribution wherein the periodic gas flow operating parameter distribution is sinusoidal and said processor is configured to compare each operating parameter value against the gas flow operating parameter distribution to determine whether any of said plurality of sensors is functioning incorrectly.

10. A system in accordance with claim 9 wherein said processor is configured to generate a model to simulate a curve passing through at least one operating parameter data point from at least one incorrectly positioned sensor.

11. A system in accordance with claim 9 wherein said processor is configured to compute an average and a maximum value of said operating parameter, and wherein temperature is said operating parameter.

12. A system in accordance with claim 9 wherein said processor is configured to reconstruct an incorrect sensor value using geometric relationships between said plurality of sensors and said engine.

13. A system in accordance with claim 9 wherein said processor is configured to compare at least one of said values against a predetermined threshold when said reading value is not approximately equal to a modeled value.

14. A system in accordance with claim 13 wherein said processor is configured to identify which of said plurality of sensors is not functioning correctly when said value corresponding to that sensor is not within said predetermined threshold.

15. An apparatus comprising:

at least one engine component and a plurality of sensors, said plurality of sensors positioned relative to an index location;

a periodic gas flow temperature distribution profile extending across an engine component or between engine components; and a controller comprising a processor and a memory, said controller configured to receive gas flow temperature values from each of said plurality of sensors, to determine at least one engine operating parameter for defining a periodic gas flow operating parameter distribution and to compare each operating parameter reading value against said periodic gas flow operating parameter distribution to determine whether one of said plurality of sensors is functioning incorrectly.

16. A system in accordance with claim 15 wherein said processor is configured to generate a model to simulate a curve passing through at least one operating parameter data point from at least one incorrectly positioned sensor.

17. An apparatus in accordance with claim 15 wherein said processor is configured to compute an average and a maximum value of said operating parameter, and wherein temperature is said operating parameter.

* * * * *

UNITED STATES PATENT AND TRADEMARK OFFICE
CERTIFICATE OF CORRECTION

PATENT NO. : 7,481,100 B2  Page 1 of 1
APPLICATION NO. : 11/567080
DATED : January 27, 2009
INVENTOR(S) : Ponziani et al.

It is certified that error appears in the above-identified patent and that said Letters Patent is hereby corrected as shown below:

In Claim 3, column 11, line 21, delete "temperature reading value" and insert therefor --temperature value--.
In Claim 13, column 12, line 22, delete "said reading value" and insert therefor --said value--.

Signed and Sealed this

Ninth Day of February, 2010

David J. Kappos
*Director of the United States Patent and Trademark Office*